(12) United States Patent
Uchida et al.

(10) Patent No.: US 6,856,365 B2
(45) Date of Patent: Feb. 15, 2005

(54) TRANSMISSIVE LIGHT-DIFFUSING LAYER

(75) Inventors: Tatsuo Uchida, 1-11, Takasago 2-chome, Miyagino-ku, Sendai-shi, Miyagi, 983-0014 (JP); Hiroyuki Takemoto, Himeji (JP)

(73) Assignees: Daicel Chemical Industries, Ltd., Sakai (JP); Tatsuo Uchida, Sendai (JP)

( * ) Notice: Subject to any disclaimer, the term of this patent is extended or adjusted under 35 U.S.C. 154(b) by 3 days.

(21) Appl. No.: 10/362,925

(22) PCT Filed: Jun. 10, 2002

(86) PCT No.: PCT/JP02/05762

§ 371 (c)(1),
(2), (4) Date: Feb. 27, 2003

(87) PCT Pub. No.: WO02/103414

PCT Pub. Date: Dec. 27, 2002

(65) Prior Publication Data

US 2003/0179456 A1 Sep. 25, 2003

(30) Foreign Application Priority Data

Jun. 15, 2001 (JP) ........................................ 2001-181641

(51) Int. Cl.[7] ..................... G02F 1/1335; G02F 1/1333; G02F 1/13; B32B 5/22
(52) U.S. Cl. ......................... 349/112; 349/86; 349/187; 428/317.9
(58) Field of Search ........................... 349/86, 112, 187; 428/317.9

(56) References Cited

U.S. PATENT DOCUMENTS 5,976,686 A * 11/1999 Kaytor et al. ............ 428/317.9

FOREIGN PATENT DOCUMENTS

| EP | 1 081 633 A2 | 3/2001 |
| EP | 1 083 445 A1 | 3/2001 |
| JP | 61-8430 B2 | 3/1980 |
| JP | 11-323196 A | 11/1999 |
| JP | 2000-241609 A | 9/2000 |
| JP | 2001-31774 A | 2/2001 |

* cited by examiner

*Primary Examiner*—Robert H. Kim
*Assistant Examiner*—Jeanne Andrea Di Grazio
(74) *Attorney, Agent, or Firm*—Birch, Stewart, Kolasch & Birch, LLP

(57) ABSTRACT

A light-diffusing layer 16 having at least a bicontinuous phase structure is formed by coating a substrate 14a with a coating liquid composition containing a plurality of resins being different in refractive index with each other, drying the substrate, and heating the resultant to cause spinodal decomposition from the resin-containing layer on a transparent substrate. A transparent conductive layer (or a transparent electrode) 17 may be formed on the light-diffusing layer 16 of the substrate 14a. A liquid crystal cell 13 of a reflective liquid crystal display apparatus may be formed by facing the transparent conductive layer 17 with a reflection electrode 19 formed on the other substrate 14b, and sealing a liquid crystal 18 between a pair of electrodes, 17 and 19. The present invention, therefore, provides a light-diffusing layer capable of uniformly and brightly displaying an image on a screen in a reflective liquid crystal display apparatus of an internal light-diffusing layer system in which the light-diffusing layer is formed on a substrate of a liquid crystal cell.

21 Claims, 2 Drawing Sheets

TRANSMISSIVE LIGHT-DIFFUSING LAYER

This application is the national phase under 35 U.S.C. § 371 of PCT International Application No. PCT/JP02/05762 which has an International filing date of Jun. 10, 2002, which designated the United States of America.

TECHNICAL FIELD

The present invention relates to a transmissive light-diffusing layer useful for improving brightness on a screen in a liquid crystal display apparatus (such as a reflective liquid crystal display apparatus), and a process for producing the same.

BACKGROUND ART

A liquid crystal display apparatus has been utilized in the display segments of personal computers (PC), word processors, liquid crystal televisions, clocks or watches, desktop calculators and others. Recent years have witnessed advances in the construction of infrastructures for telecommunication systems such as internets and in the network consolidation of information through the computer-communications equipment integration. For an efficient utilization of such networks, currently, portable information terminals typified by PDA (Personal Digital Assistance) have been developed, as well as further-downsized mobile personal computers having reduced thickness and weight compared with present notebook-sized personal computers.

Since portability is required of such equipments, it is necessary to reconcile realization for a battery operating a longer time with the need for downsizing and reducing thickness of such equipments. Displays using in such equipment, therefore, demand reduced thickness, reduced weight and low power consumption. A reflective (reflecting type) liquid crystal display apparatus is considered to be the most promising one since the apparatus satisfying these demands.

As a liquid crystal display unit constituting the reflective liquid crystal display apparatus, there is known a variety of elements such as TN (Twisted Nematic) and STN (Super Twisted Nematic) elements, but elements utilizing single polarizing plate type is advantageous to color display and high-definition display.

In such a reflective liquid crystal unit, it is necessary to make the best possible use of a natural light (available light) or an ambient light (external light) for illuminating the display screen by efficiently inducing an incident light on a liquid crystal layer, by scattering a light reflected from an electrode of a liquid crystal cell to an extent not deteriorating visibility and by preventing total reflection.

Concerning a reflective liquid crystal apparatus utilizing single polarizing plate, in Photofabrication Symposium '92 sponsored by the Japanese Society of Printing, the fundamental technology was introduced, as well as the liquid crystal display apparatus having an enlarged viewing angle of the display screen through the prevention of total reflection by using a surface-corrugated metal thin film as the lower electrode. However, in diffusing and reflecting plate system, in order to enhance the directionality of a diffused and reflected light, it is necessary that configuration and distribution of the corrugated (uneven) part of the reflecting plate is accurately controlled, resulting in a high cost. Further, in order to realize high-quality image, it is necessary that the corrugated (uneven) part of the reflection electrode is smoothed with resin-coating etc. for keeping the thickness of the liquid crystal part uniform. However, such a complex technique further makes lowering of production cost and stability in quality harder.

In addition to such a diffusing and reflecting plate system, there has been also known a liquid crystal display apparatus with a transmissive light-diffusing sheet. For example, Japanese Patent Publication No. 8430/1986 (JP-61-8430B) discloses a liquid crystal display apparatus comprising a polarizing layer formed on a front side of a liquid crystal cell, and a light-diffusing layer laminated on the polarizing layer. However, in the transmissive light-diffusing sheet system, since a member such as a substrate is interposed between a light-diffusing sheet and a liquid crystal part, problems such as ghost and blur of images on the display surface are inevitable.

To improve image clearness or definition, Japanese Patent Application Laid-Open No. 323196/1999 (JP-11-323196A) discloses an internal light-diffusing layer system in which a light-diffusing layer is disposed on a surface of a substrate constituting a liquid crystal part or member (liquid crystal cell), and the light-diffusing layer has a resin bead diffused in a transparent resin matrix. However, in the islands-in-an ocean structure of such a fine particle-diffused mode, the diffused light expands according to Gaussian distribution in principle. Thus, it is impossible to efficiently utilize the diffused light for luminance of the display, and display images to uniformly and brightly on the display screen.

Further, since it is necessary to keep the thickness of the liquid crystal cell uniform in order to ensure high-quality image, a scattering layer having a smooth surface must be formed. However, in a method which comprises coating or applying a substrate with a coating liquid composition composed of a transparent resin matrix and a resin bead and drying the substrate to form a layer, it is difficult to obtain a diffusing layer having a smooth surface because a resin bead in the vicinity of the surface generates an uneven structure depending on volume change of the resin involved in the drying step. Further, in a method using a resin bead, it is necessary to control the distribution in the particle size of the resin bead stringently, and as a result, the method has a disadvantage for cost. To form a diffusing layer having a highly smooth surface, a method which comprises coating a liquid mixture of a polymerizable monomer and a resin bead, and polymerizing the mixture with applying an ultraviolet ray is suggested, but the method is deteriorated in productivity.

It is, therefore, an object of the present invention to provide a light-diffusing layer having a smooth surface and capable of effectively obtaining high-quality image, and a process of producing the same.

It is another object of the present invention to provide a light-diffusing layer which ensures uniform and bright display of an image on a screen in an internal light-diffusing layer system having the light-diffusing layer formed on a surface of a substrate constituting a liquid crystal cell, and a process of producing the same.

It is still another object of the present invention to provide a light-diffusing layer useful for efficiently illuminating a display surface with a natural light or an ambient light in a reflective liquid crystal display apparatus, and a process of producing the same.

DISCLOSURE OF INVENTION

The inventors of the present invention did much research to accomplish the above objects and found that a transmissive light-diffusing layer, wherein the transmissive light-diffusing layer has a smooth surface and ensures uniform and bright display of an image on a screen even in a reflective liquid crystal display apparatus of an internal light-diffusing layer system, is obtained by immobilizing a phase separation structure induced by spinodal decomposition on a substrate. The present invention has been developed on the basis of the above findings.

That is, the transmissive light-diffusing layer of the present invention comprises a plurality of resins being different in refractive index with each other and has at least a bicontinuous phase structure, and the surface of the layer has a maximum difference of elevation of not more than 0.5 μm and an average roughness in center line of not more than 0.05 μm measured in accordance with JIS B 601. The difference between the refractive indices is, for example, about 0.01 to 2. The plurality of resins may be selected from the group consisting of a styrenic resin, a (meth)acrylic resin, a vinyl ester-series resins, a vinyl ether-series resin, a halogen-containing resin, an olefinic resin, a polycarbonate-series resin, a polyester-series resin, a polyamide-series resin, a thermoplastic polyurethane resin, a polysulfone-series resin, a polyphenylene ether-series resin, a cellulose derivative, a silicone resin, and a rubber or an elastomer (in particular, the group consisting of a styrenic resin, a (meth)acrylic resin, an alicyclic olefinic resin, a polyester-series resin, and a cellulose derivative). Moreover, the plurality of resins may be noncrystalline and soluble in a common solvent. In the case where the plurality of resins comprises a first resin and a second resin, the ratio of the first resin relative to the second resin [the former/the latter] is about 20/80 to 80/20 (weight ratio). The light-diffusing layer is usually formed on a substrate and has a bicontinuous phase structure formed by spinodal decomposition from a liquid phase or an intermediate phase-separation structure mingled a bicontinuous phase with a droplet phase. The average periodic distance in a phase separation structure of the light-diffusing layer is about 1 to 15 μm. The rectilinear transmittance of the light-diffusing layer is, for example, about 0.1 to 15% for a thickness of 8 to 15 μm. The light-diffusing layer may be formed on a substrate, for example, a transparent substrate (or transparent support) constituting a liquid crystal cell of a reflective liquid crystal display apparatus. Moreover, the thickness of the light-diffusing layer is, for example, about 3 to 50 μm. The light-diffusing layer may be substantially isotropic.

The light-diffusing layer may be produced by inducing spinodal decomposition on a substrate (or support), from a resin-containing layer composed of a plurality of resins being different in refractive index with each other to form a light-diffusing layer having at least a bicontinuous phase structure. For example, the light-diffusing layer may be produced by coating or applying the substrate with a coating liquid composition containing a plurality of resins being different in refractive index with each other, evaporating a solvent from the composition to form a light-diffusing layer having at least a bicontinuous phase structure by spinodal decomposition. This process may comprise a step for coating or applying the coating liquid composition on the substrate, a drying step, and a heating step. More specifically, for example, the light-diffusing layer may be produced by coating or applying a coating liquid composition in which a (meth)acrylic resin and a styrenic resin are dissolved on a transparent substrate, drying, and heating the coated layer at 140 to 300° C. The substrate may be a transparent substrate having a low birefringence index and optical isotropy. Moreover, the substrate may be a transparent substrate constituting a liquid crystal cell.

The present invention further includes a liquid crystal display apparatus comprising a liquid crystal cell and the light-diffusing layer. The liquid crystal display apparatus may comprise a liquid crystal cell having a liquid crystal sealed therein, a reflecting means disposed behind of the liquid crystal cell for reflecting an incident light, and the light-diffusing layer disposed in front of the reflecting means. Moreover, in the liquid crystal display apparatus, a polarizing plate may be disposed in front of the liquid crystal cell, and the light-diffusing layer may be disposed between the liquid crystal cell and the polarizing plate. The liquid crystal cell may comprise a pair of substrates comprising a back side-substrate and a transparent front side-substrate, a liquid crystal sealed between the pair of substrates, a conductive layer formed on an inner surface of the back side-substrate, a light-diffusing layer formed on an inner surface (on the surface of the liquid crystal side) of the front side-substrate, and a transparent conductive layer formed on an inner surface of the light-diffusing layer.

In such a light-diffusing layer and a process for producing the same, it is unnecessary to go through complex processes such as coating and polymerization, and a light-diffusing layer having a smooth surface can be formed by simple operations such as coating, drying and heating. Further, since light-diffusing properties are imparted to the layer by a phase separation structure without the need for a resin bead, the process can be drastically lower the cost of production.

Throughout this specification, the term "light-diffusing layer" means a layer which has a light-scattering function and may be formed on a substrate. Moreover, the term "light diffusion" is substantially used synonymous with the term "light diffusion".

BEST MODE FOR CARRYING OUT THE INVENTION

Figure 2:
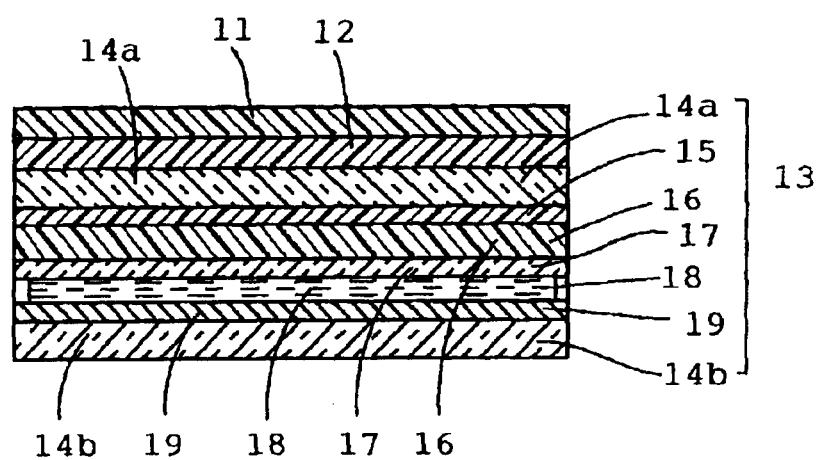
FIG. 2 is a schematic cross-section view showing an embodiment of a reflective liquid crystal display (LCD) apparatus.

The present invention shall now be described in detail with reference as necessary to the attached drawings. FIG. 2 is a schematic cross-section view showing an embodiment of a liquid crystal display apparatus comprising the light-diffusing layer of the present invention.

The light-diffusing layer (light-diffusing sheet or film) comprises a plurality of resins being different in refractive index with each other. The plurality of resins may be used in combination in such manner that the difference of refractive index between the resins is, for example, about 0.01 to 0.2, and preferably about 0.1 to 0.15 (e.g., about 0.01 to 0.1). A plurality of resin may, for example, be suitably selected from the following resins in combination: a styrenic resin, a (meth)acrylic resin, a vinyl ester-series resin (for example, a polyvinyl acetate, an ethylene-vinyl acetate copolymer, a vinyl acetate-vinyl chloride copolymer, and a derivative thereof such as a polyvinyl alcohol, an ethylene-vinyl alcohol copolymer and a polyvinyl acetal resin), a vinyl ether-series resin (for example, a homo- or copolymer of a vinyl $C_{1-10}$alkyl ether, and a copolymer of a vinyl $C_{1-10}$alkyl ether and maleic anhydride), a halogen-containing resin (for example, a polyvinyl chloride, a polyvinylidene fluoride, and a vinyl chloride-vinyl acetate copolymer), an olefinic resin (for example, an ethylene-(meth)acrylic acid copolymer, an ethylene-(meth)acrylate copolymer, and an alicyclic olefinic resin), a polycarbonate-series resin (for example, a bisphenol A-based polycarbonate, a diethylene glycol bisallylcarbonate), a polyester-series resin, a polyamide-series resin (an aliphatic, alicyclic, or aromatic homopolyamide or copolyamide), a thermoplastic polyurethane resin, a polysulfone-series resin (e.g., a polyether sulfone, a polysulfone), a polyphenylene ether-series resin (e.g., a polymer of 2,6-xylenol), a cellulose derivative [for example, a $C_{2-4}$alkylcarboxylic acid ester of cellulose such as a cellulose acetate (e.g., a cellulose diacetate, a cellulose triacetate), a cellulose propionate, a cellulose butyrate, a cellulose acetate propionate and a cellulose acetate butyrate, a cellulose carbamate, and a cellulose ether], a silicone resin (for example, a polydimethylsiloxane, and a polymethylphenylsiloxane),a rubber or elastomer (e.g., a diene-series rubber such as a polybutadiene and a polyisoprene, a styrene-butadiene copolymer, an acrylonitrile-butadiene copolymer, an acrylic rubber, a urethane rubber, and a silicone rubber).

The styrenic resin includes a homo- or copolymer of a styrenic monomer (e.g. a polystyrene, a styrene-α-methylstyrene copolymer, a styrene-vinyl toluene copolymer); and a copolymer of a styrenic monomer and other polymerizable monomer (e.g., a (meth)acrylic monomer, maleic anhydride, a maleimide-series monomer, a diene), for example, a styrene-acrylonitrile copolymer (AS resin), a copolymer of styrene and a (meth)acrylic monomer [e.g., a styrene-(meth)acrylate copolymer such as a styrene-methyl methacrylate copolymer, a styrene-(meth)acrylic acid copolymer, a styrene-methyl methacrylate-(meth) acrylate copolymer, a styrene-methyl methacrylate-(meth) acrylic acid copolymer], and a styrene-maleic anhydride copolymer. The preferred styrenic resin includes a polystyrene, a copolymer of styrene and a (meth)acrylic monomer [e.g., a copolymer comprising styrene and methyl methacrylate as main component such as a styrene-methyl methacrylate copolymer], an AS resin, a styrene-butadiene copolymer and the like.

As the (meth)acrylic resin, a homo- or copolymer of a (meth)acrylic monomer and a copolymer of a (meth)acrylic monomer and a copolymerizable monomer can be employed. As the (meth)acrylic monomer, there may be mentioned, for example, (meth)acrylic acid; a $C_{1-10}$alkyl (meth)acrylate such as methyl (meth)acrylate; a hydroxyalkyl (meth)acrylate; glycidyl (meth)acrylate; (meth) acrylonitrile; a (meth)acrylate having an alicyclic hydrocarbon group such as tricyclodecane. The copolymerizable monomer includes the above styrenic monomer, a vinyl ester-series monomer, maleic anhydride, maleic acid, and fumaric acid. The monomer may be used singly or in combination.

As the (meth)acrylic resin, there may be mentioned a poly(meth)acrylate such as a polymethyl methacrylate, a methyl methacrylate-(meth)acrylic acid copolymer, a methyl methacrylate-(meth)acrylate copolymer, a methyl methacrylate-acrylate-(meth)acrylic acid copolymer, and a (meth)acrylate-styrene copolymer (MS resin). The preferred (meth)acrylic resin includes a methyl methacrylate-series resin comprising a poly $C_{1-6}$alkyl (meth)acrylate such as a poly(methyl (meth)acrylate), particularly methyl methacrylate, as main component (about 50 to 100% by weight, and preferably about 70 to 100% by weight).

As the alicyclic olefinic resin, there may be mentioned a homo- or copolymer of a cyclic olefin such as norbornene and dicyclopentadiene (e.g., a polymer having an alicyclic hydrocarbon group such as tricyclodecane which is sterically rigid), a copolymer of the cyclic olefin and a copolymerizable monomer (e.g., an ethylene-norbornene copolymer, a propylene-norbornene copolymer). The alicyclic olefinic resin can be commercially available as, for example, the trade name "ARTON", the trade name "ZEONEX" and the like.

The polyester-series resin includes an aromatic polyester obtainable from an aromatic dicarboxylic acid such as terephthalic acid (a homopolyester, e.g. a poly$C_{2-4}$alkylene terephthalate such as a polyethylene terephthalate and a polybutylene terephthalate, a poly$C_{2-4}$alkylene naphthalate, and a copolyester comprising a $C_{2-4}$alkylene arylate unit (a $C_{2-4}$alkylene terephthalate unit and/or a $C_{2-4}$alkylene naphthalate unit) as a main component (e.g., not less than 50% by weight). The copolyester includes a copolyester in which, in constituting units of a poly$C_{2-4}$alkylene arylate, a part of $C_{2-4}$alkylene glycols is substituted with a polyoxy$C_{2-4}$alkylene glycol, a $C_{6-10}$alkylene glycol, an alicyclic diol (e.g., cyclohexane dimethanol, a hydrogenated bisphenol A), a diol having an aromatic ring (e.g., 9,9-bis(4-(2-hydroxyethoxy)phenyl)fluorene having a fluorenone side chain, a bisphenol A, a bisphenol A-alkylene oxide adduct) or the like, and a copolyester in which, in constituting units, a part of aromatic dicarboxylic acids is substituted with an unsymmetric aromatic dicarboxylic acid such as phthalic acid and isophthalic acid, an aliphatic $C_{6-12}$dicarboxylic acid such as adipic acid or the like. The polyester-series resin also includes a polyarylate-series resin, an aliphatic polyester obtainable from an aliphatic dicarboxylic acid such as adipic acid, and a homo- or copolymer of a lactone such as ε-caprolactone. The preferred polyester-series resin is usually non-crystalline like a non-crystalline polyester (e.g., a $C_{2-4}$alkylene arylate-series copolyester).

As the plurality of resins, resins which are non-crystalline and soluble in an organic solvent (particularly a common solvent for dissolving the plurality of resins) are usually employed. In particular, a resin [for example, a styrenic resin, a (meth)acrylic resin, an alicyclic olefinic resin, a polyester-series resin, and a cellulose derivative (e.g., a cellulose ester)] is preferred which is excellent in moldability or film-forming (film-formable) property, and transparency.

The glass transition temperature of the resin may be selected within the range of, for example, about −100° C. to 250° C., and preferably about 0° C. to 200° C. (for example, about 50° C. to 180° C.). From the viewpoint of strength and rigidity of the light-diffusing layer, it is advantageous that the glass transition temperature of at least one resin is not less than 50° C. (e.g., about 70° C. to 200° C.), and preferably about 100° C. to 170° C. The weight-average molecular weight of the resin may, for example, be selected within the range of not more than 1,000,000 (e.g., about 10,000 to 1,000,000), and preferably about 10,000 to 700,000.

The plurality of resins may comprise a first resin and a second resin in combination. Each of the resins, the first resin and the second resin, may comprise single resin, or a plurality of resins. A combination of the first resin with the second resin is not particularly limited to a specific combination. For example, in the case where the first resin is a styrenic resin (e.g., a styrene-acrylonitrile copolymer), the second resin may be an acrylic resin [e.g., a poly(methyl methacrylate)] or a polycarbonate-series resin. In the case where the first resin is an ether-series resin (e.g., a polyvinyl methyl ether), the second resin may be a styrenic resin (e.g., a polystyrene). In the case where the first resin is a rubber (e.g., a polybutadiene, a polyisoprene), the second resin may be an elastomer (e.g., a styrene-butadiene copolymer, an acrylonitrile-butadiene copolymer). Further, in the case where the first resin is a cellulose derivative (e.g., a cellulose ester such as a cellulose acetate propionate), the second resin may be a styrenic resin (e.g., a polystyrene, a styrene-acrylonitrile copolymer), a (meth)acrylic resin [e.g., a poly (methyl methacrylate)], an alicyclic olefinic resin (e.g., a polymer using norbornene as a monomer thereof), a polycarbonate-series resin, a polyester-series resin (e.g., the above-mentioned poly$C_{2-4}$alkylene arylate-series copolyester), and others.

Regarding the amount of the first resin and the second resin, when the amount is too slanted toward one resin, the volume fraction of a continuous phase formed by spinodal decomposition inclines, one phase is easy to be noncontiguous and forms a droplet phase structure, and as a result directivity of a diffused light tends to deteriorate. To form at least a bicontinuous phase structure, the ratio of the first resin relative to the second resin is, for example, about 20/80 to 80/20 (weight ratio), more preferably about 30/70 to 70/30 (weight ratio), and may be about 40/60 to 80/20 (weight ratio) and preferably about 50/50 to 75/25 (weight ratio). In the case where the light-diffusing layer is formed with three or more resins, the content of each resin may be usually selected within the range of about 1 to 90% by weight (e.g., about 5 to 70% by weight, preferably about 10 to 70% by weight).

The light-diffusing layer of the present invention usually forms a phase separation structure comprising at least a bicontinuous phase structure by spinodal decomposition or other means. The bicontinuous phase structure is sometimes referred to as a bicontinuous structure or as a three-dimensionally continuous or conjugated structure, and means a structure in which at least two kinds of constituent polymer phases are continuous (network structure). It is sufficient that the light-scattering layer has at least a bicontinuous structure. Thus, the layer may have an intermediate phase separation structure such that a bicontinuous phase structure and a droplet phase structure (an independent or isolated phase structure) are mingled. Incidentally, in the spinodal decomposition, with the progress of phase separation, the polymers form a bicontinuous phase, and on further proceeding of phase separation, the continuous phase becomes discontinuous owing to its own surface tension to assume a droplet phase structure (an islands-in-an ocean structure composed of independent beads or spheres). Therefore, according to the degree of phase separation, an intermediate structure between a bicontinuous phase and a droplet phase structure, that is to say, a meso-phase structure corresponding to a degree of transition from the bicontinuous phase to the droplet phase can be formed. In the context of the present invention, the above intermediate structure is also subsumed in the concept of the bicontinuous phase structure. When the phase structure is a composite structure composed of a bicontinuous phase and a droplet phase structure, the proportion of the droplet phase (isolated resin phase) may for example be not more than 30% (by volume), preferably not more than 10% (by volume). The configuration of the bicontinuous phase structure is not particularly restricted and may be a network structure, particularly a random network structure.

The light-diffusing layer of the present invention is characterized by excellent surface smoothness. That is, the surface of the light-diffusing layer has a maximum difference of elevation of not more than 0.5 $\mu$m (e.g., about 0 to 0.4 $\mu$m, preferably about 0 to 0.3 $\mu$m, and more preferably about 0 to 0.2 $\mu$m) measured in accordance with JIS B 601. Moreover, the surface has an average roughness in center line of not more than 0.05 $\mu$m (e.g., not more than 0.04 $\mu$m, preferably not more than 0.03 $\mu$m). Further, a mean inclination angle (°) on the surface of the light-diffusing layer or that in the uneven part of the surface is, for example, not more than 1° (e.g., not more than 0.8°, particularly not more than 0.7°).

The above-mentioned light-diffusing layer is usually diminishing anisotropy within the layer or sheet plane and substantially isotropic. The term "isotropy" means that an average distance between domains of the phase separation structure (bicontinuous phase structure) is substantially uniform in all directions within the sheet plane. Accordingly, the light-diffusing layer can substantially scatter an incident light isotropically, and impart light-diffusing properties to the transmitted scattered-light.

Further, in the bicontinuous phase structure, the phase-to-phase distance (distance between same phases) usually has regularity or periodicity. The light-diffusing layer, therefore, allows a transmitted scattered-light to orient toward a specific direction by Bragg reflection. That is, use of the light-diffusing layer can impart light-diffusing properties and directivity to a transmitted scattered-light, and can strike a balance between high light-diffusing properties and high directivity. Even when the light-diffusing layer is attached to a reflective liquid crystal display apparatus, therefore, the layer can orient a transmitted scattered-light toward a certain direction, and can make the display screen highly brighter.

In the light-diffusing layer, the average periodic distance of the phase separation structure (a distance between same phases, an average phase-to-phase distance in a phase separation structure such as a bicontinuous structure) is, for example, about 1 to 15 $\mu$m (e.g., about 2 to 15 $\mu$m), preferably about 2 to 11 $\mu$m (e.g., about 2 to 10 $\mu$m), more preferably about 2 to 8 $\mu$m (e.g., about 2 to 7 $\mu$m), and usually about 1 to 10 $\mu$m. When the average phase-to-phase distance is smaller, the scattered light intensity is deteriorated, and as a result it is difficult to obtain directional diffused-light. When the average phase-to-phase distance is larger, directivity of the transmitted scattered-light is deteriorated.

Incidentally, the average period of a phase separation structure (average phase-to-phase distance in a bicontinuous phase) can, for example, be calculated by image-analyzing a photomicrograph of the light-diffusing layer [e.g., a photomicrograph taken with a microscope such as an optical microscope, a transmission microscope, a phase-contrast (phase-difference) microscope and a confocal laser microscope].

The light-diffusing layer of the present invention has a specific value in a ratio of a rectilinear light to an incident light (rectilinear transmittance), and appears to show flat or uniform light-diffusing properties. In 8 to 15 $\mu$m thick layer, the range of such rectilinear transmittance is, for example, about 0.1 to 15%, preferably about 0.5 to 13% (e.g., about 0.5 to 12%), more preferably about 1 to 12%, and particularly about 2 to 11% (e.g., about 3 to 10%).

Figure 1:
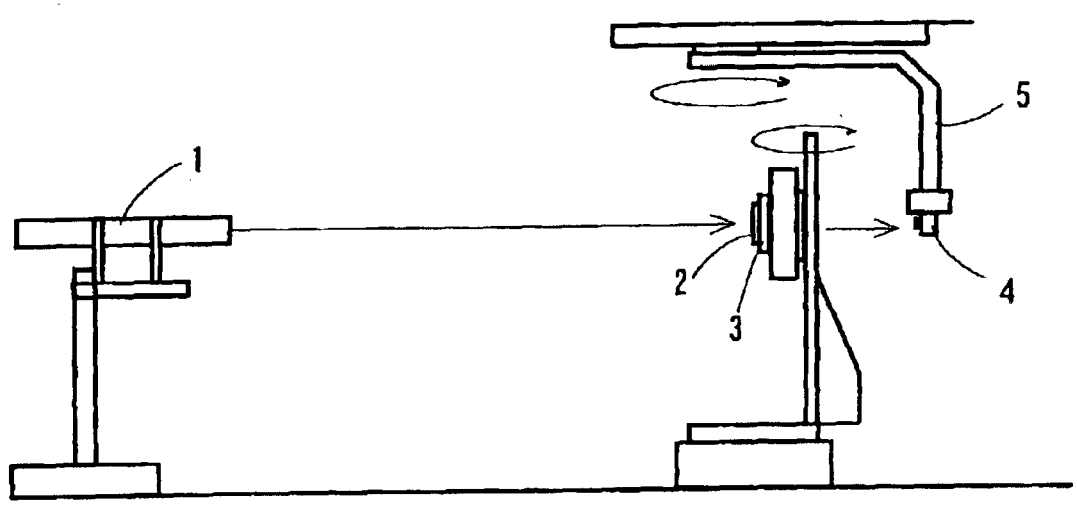
FIG. 1 is a schematic side view showing a scattering-measuring apparatus for measuring a rectilinear transmittance.

Incidentally, the rectilinear transmittance (or transmissivity) can be measured with a scattering-measuring apparatus shown in FIG. 1 (manufactured by Chuo Seiki, Co., Ltd.). This measuring apparatus comprises a light source unit 1 capable of oscillating non-polarized laser of wavelength of 543 nm, a sample stand 2 capable of putting a sample (light-diffusing layer) 3 thereon, and a light-receiving unit 4 composed of a photodiode, capable of receiving a laser beam from the light source unit 1. Incidentally, the sample stand 2 is rotatable. Further, the light-receiving unit 4 can be disposed on a light path of a laser beam, and disposed on backside or frontside of the sample stand 2 by rotation of an arm 5.

In such an apparatus, the intensity of transmitted light "A" is determined by putting the light-receiving unit on the backside of the sample stand, disposing a slit having diameter of 5 mm and an ND filter (0.35%) on the front of the light-receiving unit, radiating a laser in a direction normal to the light-diffusing sheet on the sample stand, and light-receiving a transmitted light in the light-receiving unit disposed on a light path of a laser beam. Incidentally, the diameter of laser beam is 0.1 mm, and the distance between the light-diffusing layer as a sample and the light-receiving unit is 30 cm. Then, the light-diffusing layer is taken off from the sample stand, a transparent glass plate on an equality with the light-diffusing layer in a refractive index is disposed instead of the light-diffusing layer, and a transmitted light intensity "B" is measured in the similar manner mentioned above. The rectilinear transmittance can be calculated by the following formula:

Rectilinear transmittance $(\%)=(A/B)\times 100$

The total light transmittance (transparency) of the light-diffusing layer is, for example, about 70 to 100%, preferably about 80 to 100%, and more preferably about 90 to 100%. Incidentally, the total light transmittance can be measured by means of a hazemeter (manufactured by Nippon Denshoku Industries Co., Ltd., NDH-300A).

The transmissive light-diffusing layer (or transmissive light-diffusing sheet or film) may comprise the above-mentioned light-diffusing layer singly, or may comprise a substrate (or support) and the light-diffusing layer formed thereon. As the substrate (base material or support), a transparent substrate is usually employed. The substrate may be a glass substrate or a resin substrate. The resin constituting the resin substrate includes, for example, a cellulose ester [e.g., a cellulose acetate such as a cellulose triacetate (TAC) and a cellulose diacetate], a polyester-series resin [e.g., a polyethylene terephthalate (PET), a polybutylene terephthalate (PBT), a polyarylate-series resin], a polysulfone-series resin [e.g., a polysulfone, a polyether sulfone (PES)], a polyether ketone-series resin [a polyether ketone (PEK), a polyether ether ketone (PEEK)], a polycarbonate-series resin (PC), a polyolefinic resin (e.g., a polypropylene), a cyclic polyolefinic resin (e.g., "ARTON" and "ZEONEX"), a (meth)acrylic resin, a styrenic resin (e.g., a polystyrene), and a vinyl ester- or vinyl alcohol-series resin (e.g., a polyvinyl alcohol). The resin may be a heat-resisting resin. The transparent substrate preferably has a low birefringence index and optical isotropy. As described above, the substrate may be a transparent substrate constituting a liquid crystal cell (in particular a transparent substrate constituting a liquid crystal cell of a reflective liquid crystal display apparatus).

To improve adhesiveness to the light-diffusing layer, the substrate may be subjected to an activating treatment (such as corona discharge treatment) or a surface treatment (such as anchor coating or bed treatment). Moreover, as described before, the substrate may comprise a color filter laminated thereon.

The thickness of the light-diffusing layer of the present invention is, for example, about 3 to 50 μm, preferably about 5 to 30 μm, and more preferably about 5 to 20 μm (e.g., about 5 to 15 μm). When the thickness of the light-diffusing layer is thinner, the intensity of the scattered light is reduced. When the thickness thereof is larger, scattering properties become too large, and as a result directivity of the scattered light is deteriorated.

The light-diffusing layer may be laminated on a member constituting a liquid crystal display apparatus (in particular, an optical member), for example, a member such as a polarizing plate or an optical retardation plate for coloration and high-definition of a liquid crystal image, if necessary. Further, to form a light-diffusing layer into a liquid crystal cell, a transparent conductive layer may be formed on the surface of the light-diffusing layer (that is, on the surface of the liquid crystal side) through a means such as deposition.

The light-diffusing layer may contain a variety of additives, for example, a stabilizer (e.g. an antioxidant, an ultraviolet absorber, a heat stabilizer, etc.), a plasticizer, a colorant (a dye or a pigment), a flame retardant, an antistatic agent and a surfactant. Moreover, if necessary, various coating layers such as an antistatic layer, an antifogging layer and a parting (release) layer may be formed on the surface of the light-diffusing layer.

[Process for Producing Light-diffusing Layer]

The light-diffusing layer may, for example, be formed by a polymerization-induced phase-separation method which comprises polymerizing a polymerizable composition containing a plurality of monomers or oligomers and an polymerization initiator with an actinic ray (e.g., an ultraviolet ray) to cause a phase separation accompanied with polymerization, and is preferably formed by a spinodal decomposition from a resin-containing layer comprising a plurality of resins being different in refractive index with each other. Further, a phase separation structure having at least a bicontinuous structure may be formed by a dry phase separation process which comprises heating a solid phase containing a plurality of resins incompatible with each other to spinodal decomposition, and is preferably formed by a wet spinodal decomposition from a liquid phase containing a plurality of resins. Since the wet spinodal decomposition is carried out by evaporating a solvent from a liquid phase, the method is advantageous for forming a light-diffusing layer having substantially isotropic bicontinuous phase-structure regardless of compatibility of the plurality of resins in principle, but a plurality of resins incompatible (phase separable) with each other are usually combined. In the wet method, there is employed a composition (for example, a liquid mixture or a solution) containing a plurality of resins and forming a liquid phase at a room temperature.

In the wet spinodal decomposition method, a bicontinuous phase structure can be formed by evaporating or removing a solvent from a liquid mixture containing a plurality of resins being different in refractive index with each other (a resin solution dissolved in a common solvent) or a coating liquid composition to cause a spinodal decomposition. More specifically, a transmissive light-diffusing layer (light-diffusing means) composed of a light-diffusing layer alone can be produced by casting the liquid mixture on a release support, evaporating a solvent in the liquid mixture to cause phase separation by spinodal decomposition, forming the light-diffusing layer having the bicontinuous phase structure, fixing the layer, and peeling the light-diffusing layer from the release support. Moreover, a transmissive light-diffusing layer (light-diffusing means) comprising a substrate (e.g., transparent substrate) and a light-diffusing layer can be produced by causing spinodal decomposition from a liquid phase on the substrate (or support) to generate a phase separation, forming at least a bicontinuous phase structure, and fixing the structure; by laminating the light-diffusing layer on the substrate through the use of a laminating method such as adhesion; or other methods. In the preferred method, at least a bicontinuous phase structure may be produced by coating a substrate with a coating liquid composition containing a plurality of resins being different in refractive index with each other, and evaporating a solvent to cause spinodal decomposition.

The liquid mixture containing the above-mentioned plurality of resins is usually employed as a solution which is dissolved in a common solvent (in particular a uniform solution). Incidentally, the liquid mixture containing the plurality of resins may be employed through removing an impurity (contaminant) with the use of a purification means such as filtration, centrifugation, and others. The above common solvent may be selected from solvents capable of dissolving each resin according to the species and the solubility of the resins, and may include, for example, water, an alcohol (e.g., ethanol, isopropanol, butanol, cyclohexanol), an aliphatic hydrocarbon (e.g., hexane), an alicyclic hydrocarbon (e.g., cyclohexane), an aromatic hydrocarbon (e.g., toluene, xylene), a halogenated carbon (e.g., dichloromethane, dichloroethane), an ester (e.g., methyl acetate, ethyl acetate, butyl acetate), an ether (e.g., dioxane, tetrahydrofurane), a ketone (e.g., acetone, methyl ethyl ketone, methyl isobutyl ketone), a cellosolve (e.g., methyl cellosolve, ethyl cellosolve), a cellosolve acetate, a sulfoxide (e.g., dimethyl sulfoxide), an amide (e.g., dimethylformamide, dimethylacetoamide). The solvent may be a mixed solvent.

The concentration of a solute (resin) in the liquid mixture can be selected within the range causing the phase-separation and not deteriorating castability and coating property, and is, for example, about 1 to 40% by weight, and preferably about 2 to 30% by weight (e.g., about 5 to 25% by weight).

After the liquid mixture is cast or coated on a substrate, a spinodal decomposition can be carried out by evaporating or removing a solvent at a temperature of less than a boiling point of the solvent (e.g., a temperature lower than a boiling point of the solvent by about 5 to 50° C., and in particular by about 10 to 50° C.) to cause the phase separation of the plurality of resins. The removal of the solvent may be usually carried out by drying, for example drying at a temperature of about 30 to 100° C., preferably about 40 to 80° C. By casting or coating the liquid mixture, a coating layer or a resin layer which is usually transparent or almost transparent can be formed.

In the preferred method, when a resin series is phase-separated at a higher temperature, the resin series is heated at a temperature of not lower than a glass transition and not lower than a phase separation temperature. When a resin series is phase-separated at a lower temperature, the resin series is heated at a temperature of not higher than a phase separation temperature to cause a phase separation by spinodal decomposition. In particular, the preferred method comprises coating the above-mentioned liquid mixture to a substrate, drying the substrate, and then inducing spinodal decomposition due to heating. The heating temperature may be selected, according to the spices of resins, within the range at which spinodal decomposition occurs and surface smoothness in the light-diffusing layer is not deteriorated, and is for example, about 100 to 400° C., preferably about 140 to 300° C. (e.g., about 200 to 300° C.), and more preferably about 150 to 250° C. Incidentally, the heating step may also serve other heat treating step(s) in a production process of a liquid crystal display apparatus (for example, a step for forming a transparent conductive layer with deposition). Such a method makes a production process of a liquid crystal display apparatus more efficient.

The bicontinuous phase structure formed by spinodal decomposition can be fixed by cooling to a temperature of not higher than a solidification temperature or a glass transition temperature of the component resin(s) (for example, not higher than a glass transition temperature of a main resin).

In such a method, since it is unnecessary to carry out a step which comprises dispersing a transparent resin bead uniform in size in a matrix like a fine particle-dispersed mode light-diffusing layer, the method is advantageous from the viewpoint of quality of product and cost of raw materials. Further, since a method for forming a light-diffusing layer by wet spinodal decomposition is suited to mass production, the method is advantageous from the viewpoint of cost of production.

[Reflective Liquid Crystal Display (LCD) Apparatus]

The transmissive light-diffusing layer of the present invention is available for various applications in need of light-diffusing properties, and is advantageously applicable to a display apparatus such as a liquid crystal display apparatus (in particular a reflective liquid crystal display apparatus, for example, a reflective liquid crystal display apparatus comprising a reflecting means, particularly a reflective liquid crystal display apparatus comprising both a reflecting means and a polarizing means). The liquid crystal display apparatus is not limited to a one-polarizing-plate-mode reflective LCD apparatus with one polarizing plate, and may be a two polarizing plates-mode reflective LCD apparatus with two polarizing plates being different in polarizing property. The reflective LCD apparatus utilizing one polarizing plate may be a reflective LCD apparatus combining one polarizing plate with a variety of modes (e.g. a TN mode using a twisted nematic liquid crystal, a R-OCB (optically compensated bend) mode, a parallel alignment mode, etc.).

Further, the light-diffusing layer of the present invention can be also applied to a reflective LCD apparatus utilizing the wavelength selectivity in reflection of a chiral nematic liquid crystal.

FIG. 2 is a schematic cross-section view showing an embodiment of the reflective LCD apparatus. This LCD apparatus comprises a liquid crystal cell 13 having a liquid crystal (e.g., liquid crystal layer) 18 sealed between a pair of substrates (e.g., glass plate, plastics) 14a and 14b, and a reflection electrode 19 laminated on one substrate (back side-substrate) 14b of the substrates constituting the liquid crystal cell by means of deposition or other means. On one side (surface of liquid crystal side, interior surface) of other substrate (front side-substrate) 14a constituting the liquid crystal cell 13, a light-diffusing layer 16 is laminated through a color filter layer 15 displaying color. A transparent conductive layer (or transparent electrode) 17 is laminated on an inner surface of the light-diffusing layer (on surface of the liquid crystal side) by means of deposition or other means. That is, an electrode is formed on the inner facing surfaces of the pair of substrates 14a and 14b, and the electrode of one substrate (back side-substrate) 14b is formed as a reflecting means. Further, on the other side of the front side-substrate 14a (exterior surface, surface of the front side), an optical retardation film (optical retardation layer) 12 and a polarizing plate (polarizing layer) 11 for polarizing a reflection light reflected by the reflection electrode 19 are laminated.

In such a reflective LCD apparatus, a light incident from a front surface on the viewer side (a incident light such as a natural light or an ambient light) is transmitted and diffused through the light-diffusing layer 16 and reflected by the reflection electrode 19, and the reflected light is transmitted and rescattered through the diffusing layer 16. In particular, the surface of the light diffusing layer 16 (the surface of the liquid crystal 18 side) has high smoothness. Even in a display apparatus of an internal light-diffusing layer system in which the light-diffusing layer 16 is formed on the surface of the substrate 14a constituting the liquid crystal cell 13, the display surface can be effectively illuminated with a natural light or an ambient light, and an image can be uniformly and brightly displayed in the screen to ensure high image quality. Further, when the transmitted scattered-light has directivity, the reflected light can be scattered by high light scatteration and the intensity of the reflected light can be allowed to orient toward a predetermined direction. Accordingly, the display screen can be lightened, and the sufficient brightness can be ensured even in color display, and the sharp color image can be realized in the color display-mode reflective LCD apparatus.

The present invention also includes, as apparent from the above-mention, (a) a substrate (particularly a transparent substrate) constituting a liquid crystal cell (particularly a liquid crystal cell of a reflective liquid crystal display apparatus), wherein a light-diffusing layer is formed on the inner facing surfaces to a reflecting layer (surface of the liquid crystal side), if necessary, through a color filter, and (b) a substrate in which a transparent conductive layer is formed on a light-diffusing layer. Further, the present invention includes (c) a liquid crystal cell which comprises a pair of substrates composed of a back side-substrate and a transparent front side-substrate, a liquid crystal sealed between these substrates, a conductive layer formed on an inner surface of the back side-substrate, a light-diffusing layer formed on an inner surface of the front side-substrate (on the surface of the liquid crystal side), and a transparent conductive layer formed on an inner surface of the light-diffusing layer.

Incidentally, the back side-substrate 14b may be not always transparent. Moreover, both substrates, 14a and 14b, may be a transparent substrate, and the reflecting means may be not always a reflection electrode. For example, the above pair of electrodes may be formed from transparent substrates, transparent electrodes may be formed on the inner facing surfaces of the transparent substrates, and a reflecting means (e.g., a reflecting layer such as specular reflection layer) for reflecting an incident light may be formed on a back side-substrate of the pair of substrates.

Further, in the liquid crystal display apparatus, the position for disposing the light-diffusing layer having a bicontinuous phase structure is not particularly limited as far as a reflecting means for reflecting an incident light is disposed in the near of the liquid crystal cell and the light-diffusing layer is disposed in front of the reflecting means. Moreover, it is sufficient that the polarizing plate may be disposed in a light path (incident path and emerge path). The position for disposing the polarizing means and the light-scattering layer is not particularly limited and the light-scattering layer may be disposed in front of the polarizing means. In the preferred embodiment, in order to lighten a display surface by the polarizing means, the polarizing plate is disposed in front of the liquid crystal cell, and the light-diffusing layer is disposed between the liquid crystal cell and the polarizing plate.

Incidentally, the transparent conductive layer (or transparent electrode) or the reflection electrode may, for example, be formed with the use of a conductive agent such as tin-doped indium oxide ITO and Sb- or F-doped tin oxide, or a substrate for a reflecting layer such as aluminum, and the reflection electrode may be formed through the use of physical or chemical deposition, lithography, or other means. Moreover, to improve adhesiveness, a surface treatment such as corona discharge treatment may be subjected on the surface, on which a conductive layer is formed, of the light-diffusing layer or substrate as the same manner as in the above-mentioned. Further, the reflecting means (reflecting layer) can be formed with a thin layer such as a vapor deposition film made of aluminum.

The substrate, the color filter, the light-diffusing layer, the optical retardation plate and the polarizing plate may be laminated with an adhesive layer. That is, the light-diffusing layer of the present invention may be used with laminating the other functional layer (e.g., a substrate, a polarizing plate, an optical retardation plate, a light-reflecting plate, and a transparent conductive layer) according to the structure of the display unit and the arrangement of each member. Incidentally, when the reflective LCD apparatus is employed as a monochrome display apparatus, the above color filter is not indispensable.

Moreover, the optical retardation plate may be disposed in a STN (Super Twisted Nematic) liquid crystal display apparatus, though the plate is not indispensable in a TFT liquid crystal display element. The optical retardation plate may be disposed in a suitable position, for example, between the front transparent substrate and the polarizing plate. In such an apparatus, the light-diffusing layer may be interposed between the polarizing plate and the optical retardation plate, and may be interposed between the front transparent substrate and the optical retardation plate.

Since the light-diffusing layer of the present invention imparts high scatteration and directivity to a reflected light, the light-diffusing layer realizes bright display of the liquid crystal display screen across the board and improves visibility. The reflective LCD apparatus can be, therefore, utilized broadly in the display segments of electrical and electronic products such as personal computers, word processors, liquid crystal televisions, cellular phones, clocks or watches, and desktop calculators. Especially, it is preferably utilized in a liquid crystal display apparatus of a portable information terminal.

INDUSTRIAL APPLICABILITY

According to the present invention, the use of a light-diffusing layer having a bicontinuous structure and showing high surface smoothness ensures high image quality in high efficiency. In particular, in an internal light-diffusing layer system in which a light-diffusing layer is formed on a substrate surface of a liquid crystal cell, a uniform and bright display is realized in a screen. In a reflective liquid crystal display apparatus, therefore, the display surface can be effectively illuminated with a natural light or an ambient light. Further, the process of the present invention is in favor of not only quality but also cost performance because the light-diffusing layer can be formed by spinodal decomposition. Furthermore, a wet spinodal decomposition method is suited to mass production, and is advantageous from the viewpoint of productivity and production cost.

EXAMPLES

The following examples are intended to describe this invention in further detail and should by no means be interpreted as defining the scope of the invention.

Example 1

In ethyl acetate were dissolved 63 parts by weight of a poly(methyl methacrylate) (PMMA, manufactured by Mitsubishi Rayon Co., Ltd., "BR-80") and 37 parts by weight of a styrene-acrylonitrile copolymer (SAN, manufactured by Technopolymer Co, Ltd., "290ZF") to prepare a 10% by weight of a resin solution. The resin solution was filtrated, and the filtrate was cast on a glass substrate 0.7 mm thick for a reflective liquid crystal display apparatus to form a transparent resin layer 12 µm thick on the glass substrate. The substrate with the resin layer was subjected to thermal treatment in an oven at 220° C. for 20 minutes. After thermal treatment, the glass substrate was allowed standing to cool spontaneously to form a clouded light-diffusing layer on the glass substrate. When examined with a transmission optical microscope, it was found that thus obtained light-diffusing layer had an intermediate structure between a bicontinuous phase structure and a droplet phase structure, and the periodic distance of phase separation structure was 3.5 µm. Moreover, when measured with an apparatus shown in FIG. 1, the rectilinear transmittance of the light-diffusing layer was 10%.

Comparative Example 1

In 900 parts by weight of a mixture solvent of methylene chloride and methanol (methylene chloride/methanol=9/1; weight ratio) was dissolved 90 parts by weight of a cellulose triacetate (TAC, manufactured by Daicel Chemical Industries, Ltd., LT-10). In the resin solution was dispersed 10 parts by weight of crosslinked polystyrene fine particles having a mean particle size of 3 µm uniform in size, and the resultant was cast on a glass substrate for a reflective liquid crystal display apparatus of which the surface was subjected to hydrophilic treatment by corona discharge, and dried the substrate to obtain a light-diffusing layer 25 µm thick. When examined with a transmission optical microscope, it was found that thus obtained light-diffusing layer had a typical droplet structure (fine particle-dispersed structure).

Figure 3:
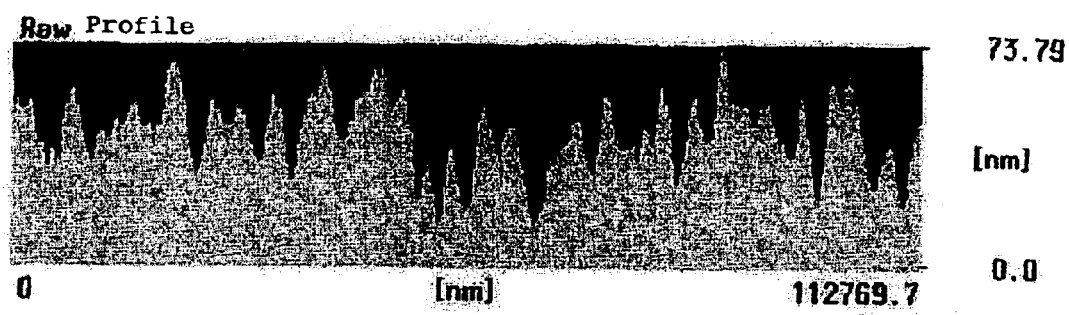
FIG. 3 is a figure showing a corrugated (uneven) state in a surface of a light-diffusing layer of Example measured with an atomic force microscope (AFM).

In the light-diffusing layers obtained in the abovementioned Example and Comparative Example, the surface properties were examined. That is, the uneven state on the surface of the light-diffusing layer in the Example was measured with an atomic force microscope apparatus (AFM, manufactured by Seiko Instruments, Inc., SPI3800). Incidentally, static electricity was eliminated on the surface to be measured. The measurement mode was DFM (Dynamic Force Microscopy) mode. As a cantilever, a DF20-type cantilever made of silicon monocrystal was used. The measure was scanned at a scanning rate of 1 Hz. An example of cross section (scanning distance=about 240 µm) obtained by the scanning was shown in FIG. 3. This scanning was repeated four times, and the maximum difference of elevation, the average roughness in center line, and the average angle of inclination were calculated based on the average value in accordance with a method shown in JIS B 601.

As a result, the maximum difference of elevation was 0.09 µm, and the average roughness in center line was 0.02 µm. The results suggest that an uneven structure responsible for deterioration of the picture is absent in the reflective liquid crystal display apparatus. Moreover, the average angle of inclination was 0.6°, and the result shows that inclination depending on an uneven structure as having great influence on the tilt angle of the liquid crystal is absent.

On the contrary, when the light-diffusing layer of Comparative Example was scanned in the same manner as in Example, the maximum difference of elevation was 1.0 µm, and this found that the layer had fatal uneven parts responsible for deterioration of the picture in the reflective liquid crystal display apparatus. It is estimated that the deterioration is caused by an uneven structure of a fine particle present in the vicinity of the surface, because the fine particle does not change its volume even as the resin solution changes its volume according to the drying step.

Figure 4:
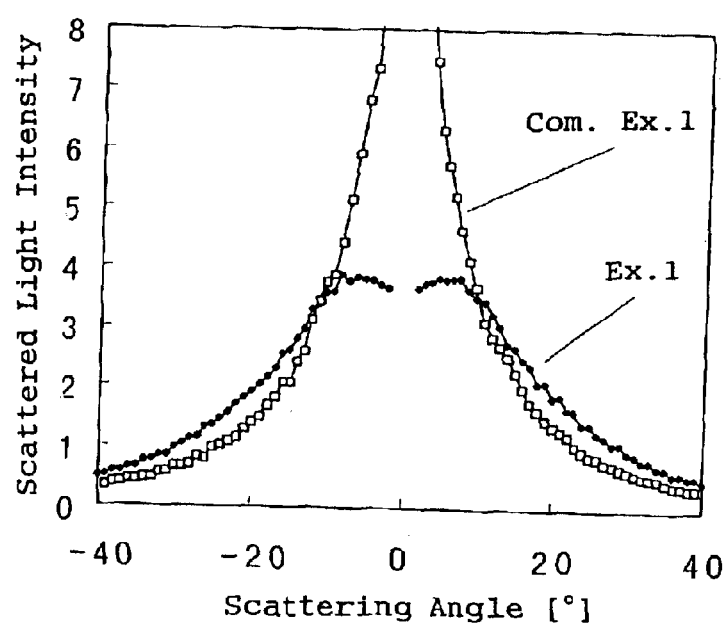
FIG. 4 is a graph showing a distribution of a scattered light intensity of a reflected light in a light-diffusing layer of Example measured with an apparatus illustrated in FIG. 1.

Further, in each of the light-diffusing layers obtained by Example and Comparative Example, a reflecting plate made of aluminum was disposed in backside thereof, and the scatteration of the reflected light was measured with a measurement apparatus shown in FIG. 1. The results are shown in FIG. 4. In this method, the direction of the regular reflection (the direction perpendicular to the plane of the light-diffusing layer) is given as 0°. As apparent from FIG. 4, the light-diffusing layer of Example has a periodic phase-separation structure by spinodal decomposition and has flat scattering properties. In the light-diffusing layer of Example, therefore, brightness of the display screen is compatible with uniformity thereof at higher level than the light-diffusing layer of Comparative Example in which the scattering angle is closer to scattering center, and the scattered-light intensity is stronger.

What is claimed is:

1. A transmissive light-diffusing layer which comprises a plurality of resins being different in refractive index with each other and has at least a bicontinuous phase structure, wherein the surface of the layer has a maximum difference of elevation of not more than 0.5 µm and an average roughness in center line of not more than 0.05 µm measured in accordance with JIS B 601.

2. A transmissive light-diffusing layer according to claim 1, wherein a difference between refractive indices of the plurality of polymers is 0.01 to 2.

3. A transmissive light-diffusing layer according to claim 1, wherein the plurality of resins is selected from the group consisting of a styrenic resin, a (meth)acrylic resin, a vinyl ester-series resins, a vinyl ether-series resin, a halogen-containing resin, an olefinic resin, a polycarbonate-series resin, a polyester-series resin, a polyamide-series resin, a thermoplastic polyurethane resin, a polysulfone-series resin, a polyphenylene ether-series resin, a cellulose derivative, a silicone resin, and a rubber or an elastomer.

4. A transmissive light-diffusing layer according to claim 1, wherein the plurality of resins is noncrystalline and soluble in a common solvent.

5. A transmissive light-diffusing layer according to claim 1, wherein the plurality of resins is selected from the group consisting of a styrenic resin, a (meth)acrylic resin, an alicyclic olefinic resin, a polyester-series resin, and a cellulose derivative.

6. A transmissive light-diffusing layer according to claim 1, wherein the plurality of resins comprises a first resin and a second resin, and the weight ratio of the first resin relative to the second resin is 20/80 to 80/20.

7. A transmissive light-diffusing layer according to claim 1, wherein the light-diffusing layer is formed on a substrate and has a bicontinuous phase structure formed by spinodal decomposition from a liquid phase or an intermediate phase-separation structure mingled a bicontinuous phase with a droplet phase; and an average periodic distance in a phase separation structure of the light-diffusing layer is 1 to 15 μm.

8. A transmissive light-diffusing layer according to claim 1, which has a rectilinear transmittance of 0.1 to 15% for a thickness of 8 to 15 μm.

9. A transmissive light-diffusing layer according to claim 1, which is formed on a transparent substrate constituting a liquid crystal cell of a reflective liquid crystal display apparatus, and the thickness of the light-diffusing layer is 3 to 50 μm.

10. A transmissive light-diffusing layer according to claim 1, which comprises first and second resins selected from the group consisting of a styrenic resin, a (meth)acrylic resin, an alicyclic olefinic resin, a polyester-series resin and a cellulose derivative, and the weight ratio of the first resin relative to the second resin is 40/60 to 80/20, and which is formed on a substrate, has at least a bicontinuous phase structure formed by spinodal decomposition from a liquid phase and having an average periodic distance of 1 to 10 μm, and has a rectilinear transmittance of 1 to 12% for a thickness of 8 to 15 μm.

11. A transmissive light-diffusing layer according to claim 1, which is substantially isotropic.

12. A process for producing a light-diffusing layer, which comprises inducing spinodal decomposition on a substrate, from a resin-containing layer composed of a plurality of resins being different in refractive index with each other to form a light-diffusing layer having at least a bicontinuous phase structure.

13. A process according to claim 12, which comprises coating or applying the substrate with a coating liquid composition containing a plurality of resins being different in refractive index with each other, evaporating a solvent from the composition to form a light-diffusing layer having at least a bicontinuous phase structure by spinodal decomposition.

14. A process according to claim 13, which comprises a step for coating or applying the coating liquid composition on the substrate, a drying step, and a heating step for the formation of the light-diffusing layer.

15. A process according to claim 12, which comprises coating or applying a coating liquid composition in which a (meth)acrylic resin and a styrenic resin are dissolved on a transparent substrate, drying, and heating the coated layer at 140 to 300° C.

16. A process according to claim 12, wherein the substrate is a transparent substrate having a low birefringence index and optical isotropy.

17. A process according to claim 12, wherein the substrate is a transparent substrate constituting a liquid crystal cell.

18. A liquid crystal display apparatus comprising a liquid crystal cell and a transmissive light-diffusing layer recited in claim 1.

19. A liquid crystal display apparatus according to claim 18, which comprises:

a liquid crystal cell having a liquid crystal sealed therein, a reflecting means disposed behind of the liquid crystal cell for reflecting an incident light, and a transmissive light-diffusing layer recited in claim 1 disposed in front of the reflecting means.

20. A liquid crystal display apparatus according to claim 18, wherein a polarizing plate is disposed in front of the liquid crystal cell, and the transmissive light-diffusing layer recited in claim 1 is disposed between the liquid crystal cell and the polarizing plate.

21. A liquid crystal display apparatus according to claim 18, wherein the liquid crystal cell comprises:

a pair of substrates comprising a back side-substrate and a transparent front side-substrate, a liquid crystal sealed between the pair of substrates, a conductive layer formed on an inner surface of the back side-substrate, a light-diffusing layer formed on an inner surface of the front side-substrate, and a transparent conductive layer formed on an inner surface of the light-diffusing layer.

* * * * *